United States Patent
Hsiao

(10) Patent No.: US 12,387,290 B2
(45) Date of Patent: Aug. 12, 2025

(54) IMAGE PROCESSING DEVICE AND IMAGE PROCESSING METHOD OF GENERATING LAYOUT INCLUDING MULTIPLE IMAGES

(71) Applicant: ASPEED Technology Inc., Hsinchu (TW)

(72) Inventor: Chia-Wei Hsiao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 358 days.

(21) Appl. No.: 18/315,485

(22) Filed: May 10, 2023

(65) Prior Publication Data
US 2024/0202868 A1    Jun. 20, 2024

(30) Foreign Application Priority Data
Dec. 15, 2022   (TW) ................... 111148134

(51) Int. Cl.
*G06T 3/4038* (2024.01)
(52) U.S. Cl.
CPC .................. *G06T 3/4038* (2013.01)
(58) Field of Classification Search
CPC .................. G06T 3/4038; G06T 11/60
See application file for complete search history.

(56) References Cited

U.S. PATENT DOCUMENTS

| | | | |
|---|---|---|---|
| 7,623,135 B1 * | 11/2009 | Diamond | H04N 9/31 345/698 |
| 10,104,288 B2 * | 10/2018 | Hung | G06T 3/4007 |
| 10,186,067 B2 | 1/2019 | Lu et al. | |
| 11,100,889 B2 * | 8/2021 | Lee | G09G 5/02 |
| 2016/0337602 A1 * | 11/2016 | Ramon | H04N 5/2628 |
| 2016/0350965 A1 * | 12/2016 | Lum | G06T 11/40 |
| 2020/0293258 A1 * | 9/2020 | Lin | G09G 5/38 |
| 2021/0366083 A1 * | 11/2021 | Gao | G06T 5/80 |
| 2024/0265638 A1 * | 8/2024 | Hayashi | H04N 19/597 |

FOREIGN PATENT DOCUMENTS

| | | |
|---|---|---|
| CN | 109979000 | 7/2019 |
| TW | 201830333 | 8/2018 |
| TW | 202215376 | 4/2022 |
| WO | 2020147413 | 7/2020 |

OTHER PUBLICATIONS

"Office Action of Taiwan Counterpart Application", issued on Jun. 15, 2023, pp. 1-9.

* cited by examiner

*Primary Examiner* — Solomon G Bezuayehu
(74) *Attorney, Agent, or Firm* — JCIPRNET

(57) ABSTRACT

An image processing device and an image processing method of generating a layout including a plurality of images are provided. The method includes: partitioning the layout into a plurality of tiles; selecting a first tile located at a border of a first display region and a second display region, and cropping a first sub-block from the first tile; mapping the first sub-block to a calibration map to obtain a mapping region; in response to a third vertex in the mapping region corresponding to a first vertex and a second vertex, performing an interpolation operation on a first data structure and a second data structure to obtain a third data structure corresponding to the third vertex; generating a composed vertex list according to the third vertex and the third data structure; and generating an output image by mapping an input image to the layout according to the composed vertex list.

17 Claims, 9 Drawing Sheets

IMAGE PROCESSING DEVICE AND IMAGE PROCESSING METHOD OF GENERATING LAYOUT INCLUDING MULTIPLE IMAGES

CROSS-REFERENCE TO RELATED APPLICATION

This application claims the priority benefit of Taiwanese application no. 111148134, filed on Dec. 15, 2022. The entirety of the above-mentioned patent application is hereby incorporated by reference herein and made a part of this specification.

BACKGROUND

Technical Field

The disclosure relates to an image processing technology, and particularly relates to an image processing device and an image processing method of generating a layout including a plurality of images.

Description of Related Art

U.S. patent publication number "U.S. Ser. No. 10/104,288" or Taiwanese patent publication number "I622021" discloses a method and a device for generating a panoramic image with a stitching process, which may convert a camera image into a panoramic image by using a data structure defined by a vertex list. However, the aforementioned patents can only output a single panoramic image.

At present, many software (for example: video conferencing software or a monitoring system) need to output various layouts, and one layout needs to display a plurality of different images. For example, the layout of the video conferencing software needs to display multiple images including different participants. Since the above-mentioned patents may only output a single panoramic image, it cannot meet the diversified layout requirements.

SUMMARY

The disclosure is directed to an image processing device and an image processing method capable of generating a layout including a plurality of images.

The disclosure provides an image processing device of generating a layout including a plurality of images. The image processing device includes a transceiver, which obtains a calibration map and a vertex list corresponding to an input image, where the vertex list includes a first vertex on the calibration map, a second vertex on the calibration map, a first data structure corresponding to the first vertex, and a second data structure corresponding to the second vertex; a storage medium, which stores a plurality of modules; and a processor, which is coupled to the storage medium and the transceiver, and accesses and executes the plurality of modules, where the plurality of modules include: a region of interest composer, which receives layout information through the transceiver to determine a first display region and a second display region in the layout; a frame tile partition unit, which partitions the layout into a plurality of tiles; a tile splitter, which selects a first tile located at a border of the first display region and the second display region from the plurality of tiles, and crops a first sub-block corresponding to the first display region from the first tile; a coordinate transformer, which maps the first sub-block to the calibration map to obtain a mapping region; an attribute interpolator, which performs an interpolation operation on the first data structure and the second data structure to obtain a third data structure corresponding to a third vertex in response to the third vertex in the mapping region corresponding to the first vertex and the second vertex; a vertex generator, which updates the vertex list according to the third vertex and the third data structure to generate a composed vertex list; and an image processing module, which generates an output image by mapping the input image to the layout according to the composed vertex list, and outputs the output image through the transceiver.

In an embodiment of the disclosure, the plurality of modules further include: a primitive assembly unit, which partitions the mapping region into a plurality of primitives according to a size of the mapping region, where the plurality of primitives include a first primitive with the third vertex.

In an embodiment of the disclosure, the plurality of modules further include: a primitive assembly unit, which determines whether the mapping region includes a splicing region of a plurality of original images according to the vertex list, and partitions the mapping region into a plurality of primitives according to a size of the splicing region in response to the mapping region including the splicing region, where the plurality of primitives include a first primitive with the third vertex.

In an embodiment of the disclosure, each of the plurality of primitives is a geometric structure with vertices.

In an embodiment of the disclosure, the layout information includes a first original display region and a second original display region in the layout, where the region of interest composer partitions the first original display region to obtain a plurality of sub-display regions including the first display region in response to partial overlapping of the first original display region and the second original display region, where the plurality of sub-display regions are not overlapped with each other, and each of the plurality of sub-display regions is not overlapped with the second original display region.

In an embodiment of the disclosure, the layout information includes a first priority corresponding to the first original display region and a second priority corresponding to the second original display region, where the region of interest composer partitions the first original display region in response to the first priority being lower than the second priority.

In an embodiment of the disclosure, the region of interest composer determines a projection method according to the layout information, where the coordinate transformer maps the first sub-block to the calibration map to obtain the mapping region according to the projection method.

In an embodiment of the disclosure, the attribute interpolator determines a first weight corresponding to the first vertex and a second weight corresponding to the second vertex according to a distance between the third vertex and the first vertex in a first direction.

In an embodiment of the disclosure, the attribute interpolator calculates a first product of a first attribute value and the first weight in the first data structure and a second product of a second attribute value and the second weight in the second data structure to generate the third data structure.

In an embodiment of the disclosure, the first data structure includes a first scaling factor and a first blending weight corresponding to the first vertex, and the second data structure includes a second scaling factor and a second blending weight corresponding to the second vertex, where the attribute interpolator calculates a first product of the first blending weight and the first weight to obtain or update a first accumulated value corresponding to the first scaling factor, and calculates a second product of the second blending weight and the second weight to obtain or update a second accumulated value corresponding to the second scaling factor, where the attribute interpolator selects the first scaling factor from the first scaling factor and the second scaling factor to generate the third data structure in response to the first accumulated value being greater than the second accumulated value.

In an embodiment of the disclosure, the storage medium further stores a first memory array and a second memory array, where after obtaining the first product, the attribute interpolator determines whether the first scaling factor matches a first address in the first memory array and determines whether data is stored in the first address, where if the data is stored in the first address, in response to determining that the first scaling factor matches the first address, the attribute interpolator accumulates the first product to a second address corresponding to the first address in the second memory array, where if the data is stored in the first address, in response to determining that the first scaling factor does not match the first address, the attribute interpolator stores the first scaling factor in a third address in the first memory array, and accumulates the first product to a fourth address corresponding to the third address in the second memory array, where if the data is not stored in the first address, the attribute interpolator stores the first scaling factor in the first address, and accumulates the first product to the second address.

In an embodiment of the disclosure, the storage medium further stores a first memory array and a second memory array, where the first scaling factor matches a first address in the first memory array, where the attribute interpolator accumulates the first product to a second address corresponding to the first address in the second memory array according to a lookup table.

In an embodiment of the disclosure, the vertex generator generates a current frame header corresponding to a current frame of the output image according to the composed vertex list, where the current frame header indicates a third display region in the layout, where the attribute interpolator copies data in the current frame header to generate a new composed vertex list corresponding to a next frame in response to a fourth display region in the next frame of the output image matching the third display region, where the data includes a fourth vertex corresponding to the third display region and a fourth data structure corresponding to the fourth vertex.

In an embodiment of the disclosure, the input image is an equirectangular projection image.

In an embodiment of the disclosure, the layout information includes at least: coordinates, a width, and a height corresponding to a first region of interest of a source image; and coordinates, a width, and a height corresponding to a display region of a target image.

The disclosure provides an image processing method of generating a layout including a plurality of images, which includes following steps: obtaining a calibration map and a vertex list corresponding to an input image, where the vertex list includes a first vertex on the calibration map, a second vertex on the calibration map, a first data structure corresponding to the first vertex, and a second data structure corresponding to the second vertex; receiving layout information to determine a first display region and a second display region in the layout; partitioning the layout into a plurality of tiles; selecting a first tile located at a border of the first display region and the second display region from the plurality of tiles, and cropping a first sub-block corresponding to the first display region from the first tile; mapping the first sub-block to the calibration map to obtain a mapping region; performing an interpolation operation on the first data structure and the second data structure to obtain a third data structure corresponding to a third vertex in response to the third vertex in the mapping region corresponding to the first vertex and the second vertex; updating the vertex list according to the third vertex and the third data structure to generate a composed vertex list; and generating an output image by mapping the input image to the layout according to the composed vertex list, and outputting the output image.

The disclosure provides an image processing device of generating a layout including a plurality of images. The image processing device includes a processor. The processor is configured to: obtain a calibration map and a vertex list corresponding to an input image, where the vertex list includes a first vertex on the calibration map, a second vertex on the calibration map, a first data structure corresponding to the first vertex, and a second data structure corresponding to the second vertex; receive layout information to determine a first display region and a second display region in the layout; partition the layout into a plurality of tiles; select a first tile located at a border of the first display region and the second display region from the plurality of tiles, and crop a first sub-block corresponding to the first display region from the first tile; map the first sub-block to the calibration map to obtain a mapping region; perform an interpolation operation on the first data structure and the second data structure to obtain a third data structure corresponding to a third vertex in response to the third vertex in the mapping region corresponding to the first vertex and the second vertex; update the vertex list according to the third vertex and the third data structure to generate a composed vertex list; and generate an output image by mapping the input image to the layout according to the composed vertex list, and output the output image.

Based on the above description, the image processing device of the disclosure partitions the layout into multiple tiles and maps the input image into the display region of the layout taking a tile formed by multiple vertices as a unit. When the display region includes a border or a splicing region, the image processing device further crops the tile into smaller sub-blocks or primitives, so as to increase the number of vertices in the border or splicing region. In this way, when the image processing device converts the input image into the output image according to the data structures of the vertices based on the method disclosed in U.S. patent publication number "U.S. Ser. No. 10/104,288" or Taiwanese patent publication number "I622021", the image processing device may be able to render the border or splicing region in the output image according to more vertex information. Therefore, the image processing device may mitigate the distortion problem at the border or splicing region while maintaining the efficiency of generating the output image.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
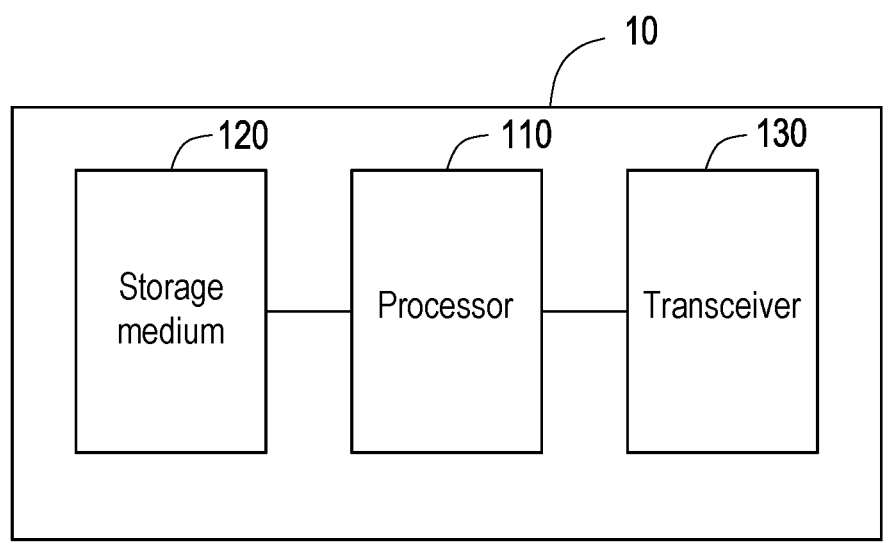
FIG. 1 is a schematic diagram of an image processing device according to an embodiment of the disclosure.

FIG. 1 is a schematic diagram of an image processing device 10 according to an embodiment of the disclosure. The image processing device 10 may include a processor 110, a storage medium 120 and a transceiver 130.

The processor 110 is, for example, a central processing unit (CPU), or other programmable general purpose or special purpose micro control unit (MCU), a microprocessor, a digital signal processor (DSP), a programmable controller, an application specific integrated circuit (ASIC), a graphics processing unit (GPU), an image signal processor (ISP)), an image processing unit (IPU), an arithmetic logic unit (ALU), a complex programmable logic device (CPLD), a field programmable gate array (FPGA) or other similar components or combinations of the above components. The processor 110 may be coupled to the storage medium 120 and the transceiver 130, and may access and execute a plurality of modules and various applications stored in the storage medium 120.

The storage medium 120 is, for example, any type of a fixed or removable random access memory (RAM), a read-only memory (ROM), a flash memory, a hard disk drive (HDD), a solid state drive (SSD) or similar components or a combination of the above components, and used to store multiple modules or various applications that may be executed by the processor 110.

The transceiver 130 transmits and receives signals in a wireless or wired manner. The transceiver 130 may also perform operations such as low noise amplification, imped- ance matching, frequency mixing, up or down frequency conversion, filtering, amplification, and similar operations.

Figure 2A:
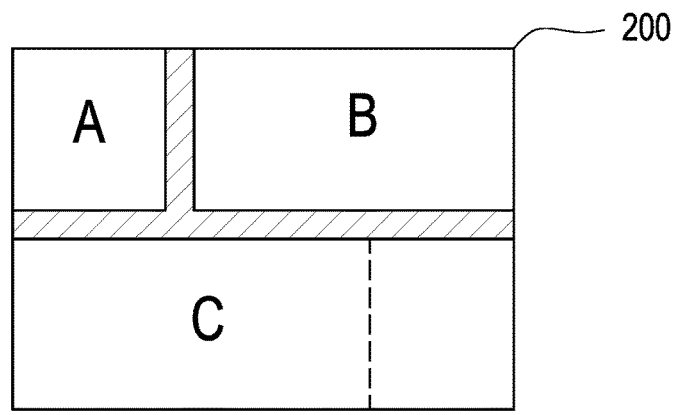
FIG. 2A is a schematic diagram of an output image corresponding to a layout according to an embodiment of the disclosure.

The image processing device 10 may generate an output image corresponding to a layout according to the user's requirement on the layout, as shown in FIG. 2A. In FIG. 2A, a layout 200 of the output image may include a plurality of display regions such as a display region A, a display region B, a display region C, etc., and the different display regions may respectively display the same or different regions of interest (ROIs) in an input image. For example, it is assumed that the layout 200 is a layout of remote conference software, and the display region A, the display region B, and the display region C may respectively display images of different participants such as a user A, a user B, and a user C. The image of the user A and the image of the user C may respectively correspond to different ROIs of the same input image. The image of the user B may correspond to a ROI of a different input image.

Figure 3A:
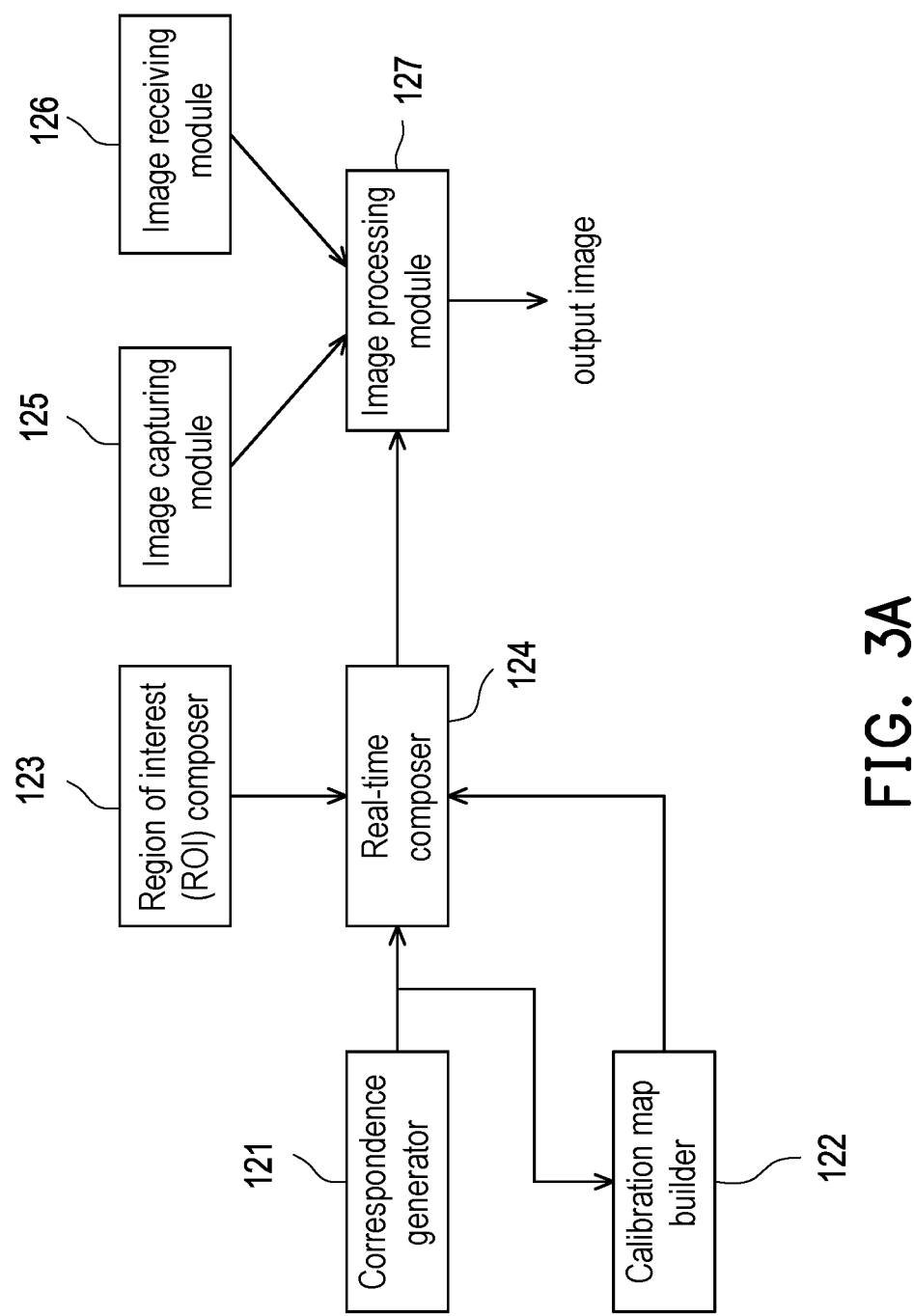
FIG. 3A is a schematic diagram of a plurality of modules in a storage medium according to an embodiment of the disclosure.

FIG. 3A is a schematic diagram of a plurality of modules in the storage medium 120 according to an embodiment of the disclosure. The processor 110 may access and execute a plurality of modules in the storage medium 120 to execute various functions of the image processing device 10. In the embodiment, the storage medium 120 may include a correspondence generator 121, a calibration map builder 122, a region of interest (ROI) composer 123, a real-time composer 124, an image capturing module 125, an image receiving module 126, an image processing module 127 and other modules, and functions of the modules will be described later.

The correspondence generator 121 is configured to generate an original vertex list (original vertex list) corresponding to the input image. A method of generating the original vertex list may refer to the content recorded in U.S. patent publication number "U.S. Ser. No. 10/104,288" or Taiwanese patent publication number "I622021". In an embodiment, the correspondence generator 121 may receive the original vertex list through the transceiver 130. The image capturing module 125 or the image receiving module 126 obtains an original image through the transceiver 130 and generates an input image. To be specific, the image capturing module 125 may be communicatively connected to one or more image capturing devices through the transceiver 130, and then receive the original image from the one or more image capturing devices that may be used to generate an equirectangular projection image. On the other hand, the image receiving module 126 may be communicatively connected to one or more electronic devices through the transceiver 130, so as to receive other types of original images that are not used to generate the equirectangular projection image. The input image may include the equirectangular projection image converted from the original image obtained by the image capturing module 125 or other types of images converted from the original image obtained by the image receiving module 126. In an embodiment, the correspondence generator 121 may generate a corresponding original vertex list according to the input image from the image capturing module 125 or the image receiving module 126, as described in U.S. patent publication number "U.S. Ser. No. 10/104,288" or Taiwanese patent publication number "I622021". In an embodiment, a single input image may include one or more textures, where the textures are, for example, a camera image (i.e., the original image). For example, an equirectangular projection image used as the input image may be formed by splicing a plurality of camera images captured by a plurality of cameras (or the equirectangular projection image obtained by converting the camera images), so that tee input image may include a plurality of textures.

The original vertex list records a plurality of vertices and a plurality of data structures respectively corresponding to the plurality of vertices. After obtaining the original vertex list, the calibration map builder 122 may generate a calibration map corresponding to the input image according to the original vertex list. For example, if a resolution of the input image is 1920×1080, the correspondence generator 121 may generate a calibration map corresponding to the resolution of 1920×1080. The original vertex list may contain a mapping relationship between the input image and the layout 200 (or the output image), and may be used to map a specific input image to a specific display region (or a specific sub-display region) in the layout 200.

Figure 4:
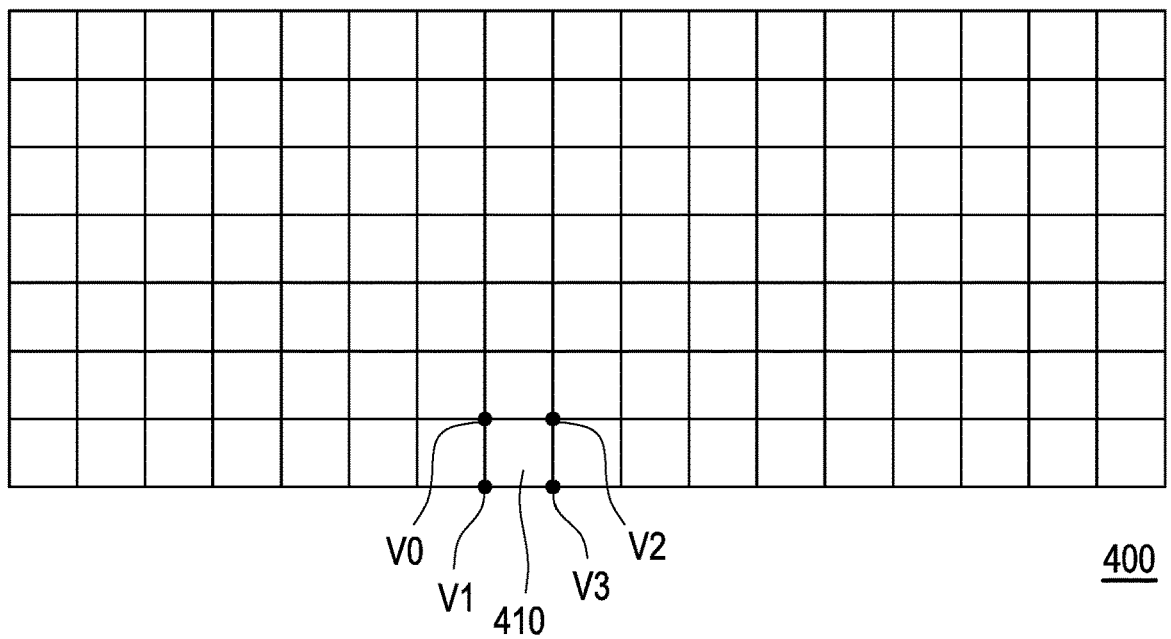
FIG. 4 is a schematic diagram of a calibration map according to an embodiment of the disclosure.

The calibration map may include the plurality of vertices recorded in the original vertex list. FIG. 4 is a schematic diagram of a calibration map 400 according to an embodiment of the disclosure. The calibration map 400 may include 144 vertices, and may include 144 data structures respectively corresponding to the 144 vertices. The plurality of vertices may form tiles. For example, the calibration map 400 may include a vertex v0, a vertex v1, a vertex v2, and a vertex v3, and may include a plurality of data structures corresponding to the vertex v0, the vertex v1, the vertex v2, and the vertex v3. The vertex v0, the vertex v1, the vertex v2, and the vertex v3 may form a tile 410.

Table is an example of information contained in the original vertex list, where the original vertex list (or the calibration map 400) is assumed to contain n vertices. A memory address of the data structure in Table 1 may point to the data structure of a specific vertex. Table 2 is an example of the data structures of the vertices of the calibration map 400, where each attribute in Table 1 and Table 2 may be obtained from the original vertex list. U.S. patent publication number "U.S. Ser. No. 10/104,288" or Taiwanese patent publication number "1622021" recites specific implementations of rendering an input image according to the data structures of the vertices to generate an output image.

TABLE 1

| Attribute | Description |
| --- | --- |
| id | Identifier of the input image corresponding to the calibration map |
| v[0].(u, v) | Coordinates of vertex v0 in the calibration map |
| v[0].vertex_ptr[ ] | Memory address of the data structure of vertex v0 |
| ... | ... |
| v[n].(u, v) | Coordinates of vertex vn in the calibration map |
| v[n].vertex_ptr[ ] | Memory address of the data structure of vertex vn |

TABLE 2

| Attribute | Description |
| --- | --- |
| ntex | The number of textures (i.e.: source images) corresponding to the vertex (if the vertex is close to a splicing region of a plurality of source images, the vertex may correspond to multiple textures) |
| tex_id | Texture identifier |
| (u, v) | Coordinates of vertex |
| alpha | Blending weight for texture |
| sca_id1 | Identifier of a first overlapping control region in the input image (pointing to a scaling factor of the first overlapping control region) |

TABLE 2-continued

| Attribute | Description |
| --- | --- |
| sca_blend1 | Blending weight of the first overlapping control region |
| sca_id2 | Identifier of a second overlapping control region in the input image (pointing to a scaling factor of the second overlapping control region) |
| sca_blend2 | Blending weight of the second overlapping control region |
| ... | ... |
| sca_idm | Identifier of an $m^{th}$ overlapping control region in the input image (pointing to a scaling factor of the $m^{th}$ overlapping control region) |
| sca_blendm | Blending weight of the $m^{th}$ overlapping control region |
| scaling coefficient | Scaling factor |

On the other hand, referring to FIG. 3A, the ROI composer 123 may receive layout information edited by a user through the transceiver 130, where the layout information includes a mapping relationship between a source image (i.e.: input image) and a target image (i.e.: output image). To be specific, the ROI composer 123 may obtain a ROI window descriptor from the layout information. Table 3 is an example of the ROI window descriptor. The ROI composer 123 may obtain information of one or a plurality of display regions from the ROI window descriptor, and determine the layout 200 shown in FIG. 2A according to the information. For example, a position and a size of the display region (for example: display region A, B or C) may be determined based on the attribute "(dst_x, dst_y)" and the attribute "(dst_w, dst_h)". It should be noted that although the example in Table 3 only records one set of the mapping relationship between the ROI window in the source image and the display region in the target image, the ROI window descriptor may also include multiple sets of mapping relationships. In other words, the user may define a plurality of ROI windows on one or more input images, or may define a plurality of display regions on the output image (or the layout 200). A projection method in Table 3 may include but not limited to rendering methods such as perspective projection, linear crop projection, or homograph transform. The linear crop projection may be applied to crop and scale the equirectangular projection image to produce an output image with a larger viewing angle.

TABLE 3

| Attribute | Description |
| --- | --- |
| win_id | Identifier of the ROI window in the source image |
| (src_x, src_y) | Coordinates of an origin (an upper left point) of the ROI window in the source image |
| (src_w, src_h) | Width and height of the ROI window in the source image |
| (dst_x, dst_y) | Coordinates of the origin (the upper left point) of the display region in the target image |
| (dst_w, dst_h) | Width and height of the display region in the target image |
| projection | Projection method |
| src_domain_id | A domain of the source image (indicating that the source image comes from the image capturing module 125 or the image receiving module 126) |

In an embodiment, the ROI composer 123 may check whether the attribute "(src_x, src_y)" and the attribute "(src_w, src_h)" meet a specification according to the attribute "projection". For example, if the attribute "projection" indicates that the projection method is a perspective projection, the ROI composer 123 may check the attribute "(src_x, src_y)" and the attribute "(src_w, src_h)" to ensure a viewing angle of the ROI window described by the two attributes is less than 180 degrees. If the viewing angle of the ROI window is greater than or equal to 180 degrees, the ROI composer 123 may determine that the layout information has an error, and may output a warning message through the transceiver 130.

In an embodiment, the ROI composer 123 may check whether the attribute "(dst_x, dst_y)" and the attribute "(dst_w, dst_h)" meet the specification according to a range of the output image (or the layout 200). For example, the ROI composer 123 may check the attribute "(dst_x, dst_y)" and the attribute "(dst_w, dst_h)" to ensure that the display region (or sub-display region) described by the two attributes does not exceed a preset range of the output image. If the display region (or sub-display region) exceeds the preset range of the output image, the ROI composer 123 may determine that the layout information has an error, and may output a warning message through the transceiver 130.

Figure 5:
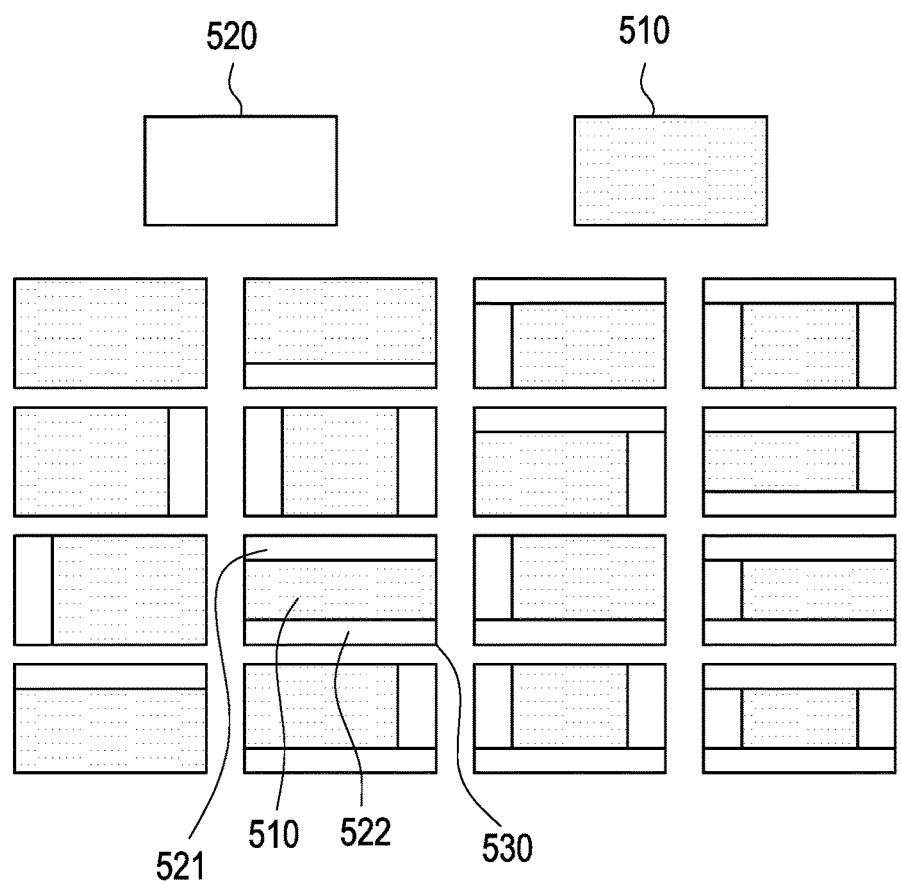
FIG. 5 is a schematic diagram illustrating an overlap mode of an original display region and an original display region according to an embodiment of the disclosure.

In an embodiment, the layout information may include a plurality of original display regions in the layout 200. If the plurality of original display regions are overlapped in the layout 200, the ROI composer 123 partitions a specific original display region according to priorities of multiple overlapped original display region, so as to generate a plurality of display regions in the layout 200. FIG. 5 is a schematic diagram illustrating an overlap mode of an original display region 510 and an original display region 520 according to an embodiment of the disclosure. It is assumed that the layout information includes the original display region 510 and the original display region 520, and the layout information records that the priority of the original display region 520 is lower than that of the original display region 510, the ROI composer 123 may select from the original display region 510 and the original display region 520 to partition the original display region 520.

To be specific, the ROI composer 123 may partition the original display region 520 into one or a plurality of sub-display regions in response to the original display region 510 being partially overlapped with the original display region 520, where the sub-display regions are not overlapped with each other, and each of the sub-display regions is not overlapped with the original display region 510. Taking an overlap mode 530 as an example, if the original display region 520 is partially overlapped with the original display region 510, and the priority of the original display region 520 is lower than that of the original display region 510, the ROI composer 123 may partition the original display region 520 into a sub-display region 521 and a sub-display region 522 from. The sub-display region 521 and the sub-display region 522 are not overlapped with each other, and neither the sub-display region 521 nor the sub-display region 522 is overlapped with the display region 510. In an embodiment, the ROI composer 123 may determine the priorities of the display regions according to the identifier of the ROI window. For example, if an order (for example: ID #2) of the identifier of the ROI window corresponding to the sub-display region 521 is greater than an order (for example: ID #1) of the identifier of the ROI window corresponding to the sub-display region 522, the priority of the sub-display region 521 may be higher than the priority of the sub-display region 522.

The ROI composer 123 may use a sub-display region descriptor to represent the generated one or more sub-display regions. Table 4 is an example of the sub-display region descriptors of the sub-display regions. When the ROI composer 123 generates a plurality of sub-display regions, the ROI composer 123 may generate a plurality of sub-display region descriptors respectively corresponding to the plurality of sub-display regions. Taking the overlap mode 530 in FIG. 5 as an example, the ROI composer 123 may generate corresponding sub-display region descriptors for the sub-display region 521 and the sub-display region 522 respectively. Since the sub-display region 521 and the sub-display region 522 correspond to the same original display region 520 (or the same ROI window), the attribute "id1" of the descriptor of the sub-display region 521 and the attribute "id1" of the descriptor of the sub-display region 522 are the same. The attribute "id1" and the attribute "id2" of a current frame may be recorded in a cache of the storage medium 120 to serve as the attribute "cache_ref_id1" and the attribute "cache_ref_id2" of a next frame. In other words, the current frame will become a reference frame for the next frame.

TABLE 4

| Attribute | Description |
| --- | --- |
| id1 | Identifier of the ROI window corresponding to the sub-display region |
| id2 | Identifier of the sub-display region |
| (dst_x, dst_y) | Coordinates of an origin (an upper left point) of the sub-display region in the target image |
| (dst_w, dst_h) | Width and height of the sub-display region in the target image |
| cache_ref_id1 | Identifier of the ROI window of the reference frame |
| cache_ref_id2 | Identifier of the sub-display region of the reference frame |
| vertex_ptr[ ] | Memory address of a data structure of a vertex in the sub-display region |

After generating one or more sub-display regions, the ROI composer 123 may update the ROI window descriptor shown in table 3 to a ROI window descriptor shown in table 5 according to the one or more sub-display regions. The ROI composer 123 may transmit the updated ROI window descriptor to the real-time composer 124.

TABLE 5

| Attribute | Description |
| --- | --- |
| win_id | Identifier of the ROI window in the source image |
| (src_x, src_y) | Coordinates of an origin (an upper left point) of the ROI window in the source image |
| (src_w, src_h) | Width and height of the ROI window in the source image |
| (dst_x, dst_y) | Coordinates of an origin (an upper left point) of the sub-display region in the target image |
| (dst_w, dst_h) | Width and height of the display region in the target image |
| projection | Projection method |
| src_domain_id | Domain of the source image (indicating whether the source image is thre equirectangular projection image) |
| subwin_num | Number of the sub-display regions |
| subwin_desc | memory address of the sub-display region descriptor |

Figure 3B:
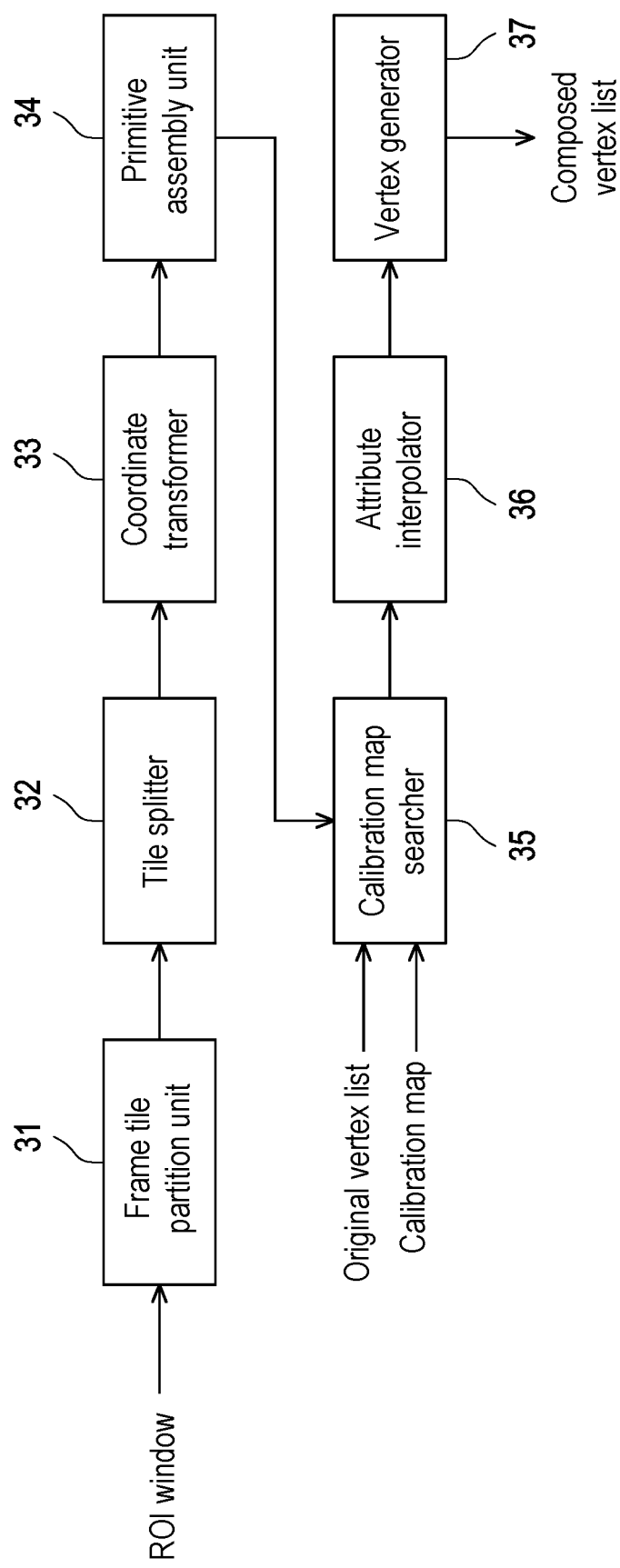
FIG. 3B is a schematic diagram illustrating a pipeline of a real-time composer according to an embodiment of the disclosure.

FIG. 3B is a schematic diagram illustrating a pipeline of the real-time composer 124 according to an embodiment of the disclosure. The pipeline of the real-time composer 124 may include a frame tile partition unit 31, a tile splitter 32, a coordinate transformer 33, and a primitive assembly unit 34, a calibration map searcher 35, an attribute interpolator 36 and a vertex generator 37. Three inputs of the pipeline include the ROI window descriptor input to the frame map tile partition unit 31, the original vertex list input to the calibration map searcher 35, and the calibration map input to the calibration map searcher 35. The pipeline may generate a composed vertex list based on the above three inputs. The vertex generator 37 may output the composed vertex list to the image processing module 127.

Figure 2B:
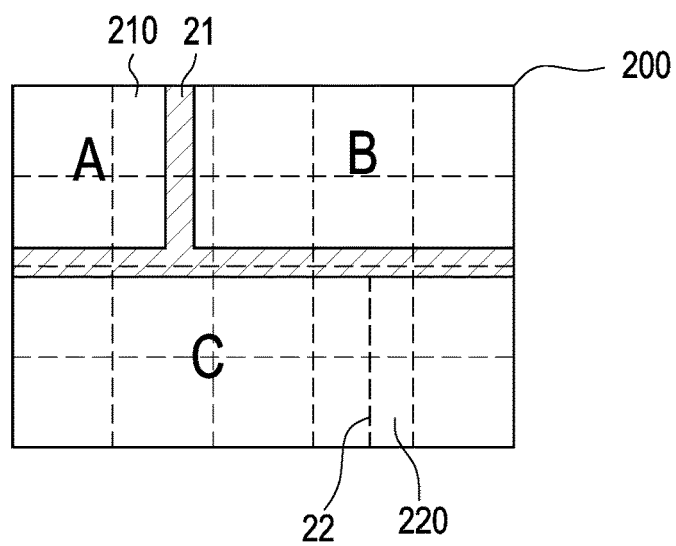
FIG. 2B is a schematic diagram of partitioning the layout into a plurality of tiles according to an embodiment of the disclosure.
Figure 2C:
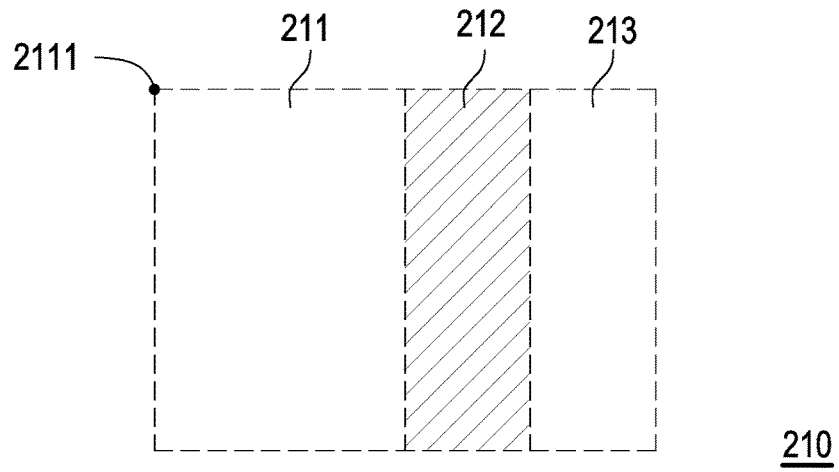
FIG. 2C is a schematic diagram of cropping out a plurality of sub-blocks from a tile according to an embodiment of the disclosure.

Referring to FIG. 2A-FIG. 2C at the same time, the frame tile partition unit 31 may generate the layout 200 shown in FIG. 2A according to the ROI window descriptor, and may partition the layout 200 into a plurality of tiles. FIG. 2B is a schematic diagram of partitioning the layout 200 into a plurality of tiles according to an embodiment of the disclosure.

The tile splitter 32 may select a tile 210 located at a border 21 of a display region A and a display region B from the plurality of tiles. Then, the tile splitter 32 may crop out a plurality of sub-blocks from the tile 210, where the plurality of sub-blocks may include a sub-block 211 corresponding to the display area A, a sub-block 212 corresponding to the border 21, and a sub-block 213 corresponding to the display area B, as shown in FIG. 2C, where a vertex 2111 is one of the vertices of the sub-block 211.

The coordinate transformer 33 may map each point in the tile or sub-block in the display region to the corresponding calibration map to obtain a mapping region on the calibration map. The coordinate transformer 33 may map the vertices of the tiles or sub-blocks in the display region to the corresponding calibration map to obtain mapping vertices on the calibration map, where the mapping vertices may constitute the mapping region.

Taking the mapping of tile or sub-block in the display region A to the calibration map as an example, it is assumed that the display region A corresponds to the calibration map 400, the coordinate transformer 33 may map the tile or sub-block (for example, the sub-block 211) corresponding to the display region A to the calibration map 400 to generate a mapping region corresponding to the display region A in the calibration map 400. To be specific, the ROI composer 123 may determine the projection method as described in table 5 according to the layout information. The coordinate transformer 33 may map a plurality of vertices of the tile or sub-block in the display region A to the calibration map 400 according to the projection method to generate a plurality of mapping vertices respectively corresponding to the plurality of vertices, wherein the plurality of mapping vertices may constitute a mapping region.

Taking the sub-block 211 in the display region A as an example, if the projection method is a linear cropping projection, the coordinate transformer 33 may map vertices of the sub-block 211 to the calibration map 400 according to equations (1) and (2), where i represents an index of the ROI window (or the identifier of the ROI window), x' represents horizontal coordinates corresponding to the calibration map 400 (i.e.: horizontal coordinates of the mapping region of the sub-block 211), and x represents horizontal coordinates corresponding to the output image (i.e.: the a horizontal coordinate of the sub-block 211), src_x represents origin horizontal coordinates of the ROI window in the source image (i.e.: input image), src_w represents a width of the ROI window in the source image, dst_x represents origin horizontal coordinates of the display region in the target image (i.e.: output image), dst_w represents a width of the display region in the target image, y' represents vertical coordinates corresponding to the calibration map 400 (i.e.: vertical coordinates of the mapping region of the sub-block 211), y represents vertical coordinates corresponding to the output image (i.e. vertical coordinates of the sub-block 211), src_y represents origin vertical coordinates of the ROI window in the source image, src_h represents a height of the ROI window in the source image, dst_y represents origin vertical coordinates of the display region in the target image, and dst_h represents a height of the display region in the target image. In the above coordinates, an origin of a coordinate system of the coordinates of the output image may be a center point of the display region A and an origin of a coordinate system of the coordinates of the calibration map 400 may be a center point of the mapping region of the display region A.

$$x' = \text{src\_x}[i] + \frac{x - \text{dst\_x}[i]}{\text{dst\_w}[i]} * \text{src\_w}[i] \quad (1)$$

$$y' = \text{src\_y}[i] + \frac{y - \text{dst\_y}[i]}{\text{dst\_h}[i]} * \text{src\_h}[i] \quad (2)$$

Figure 6:
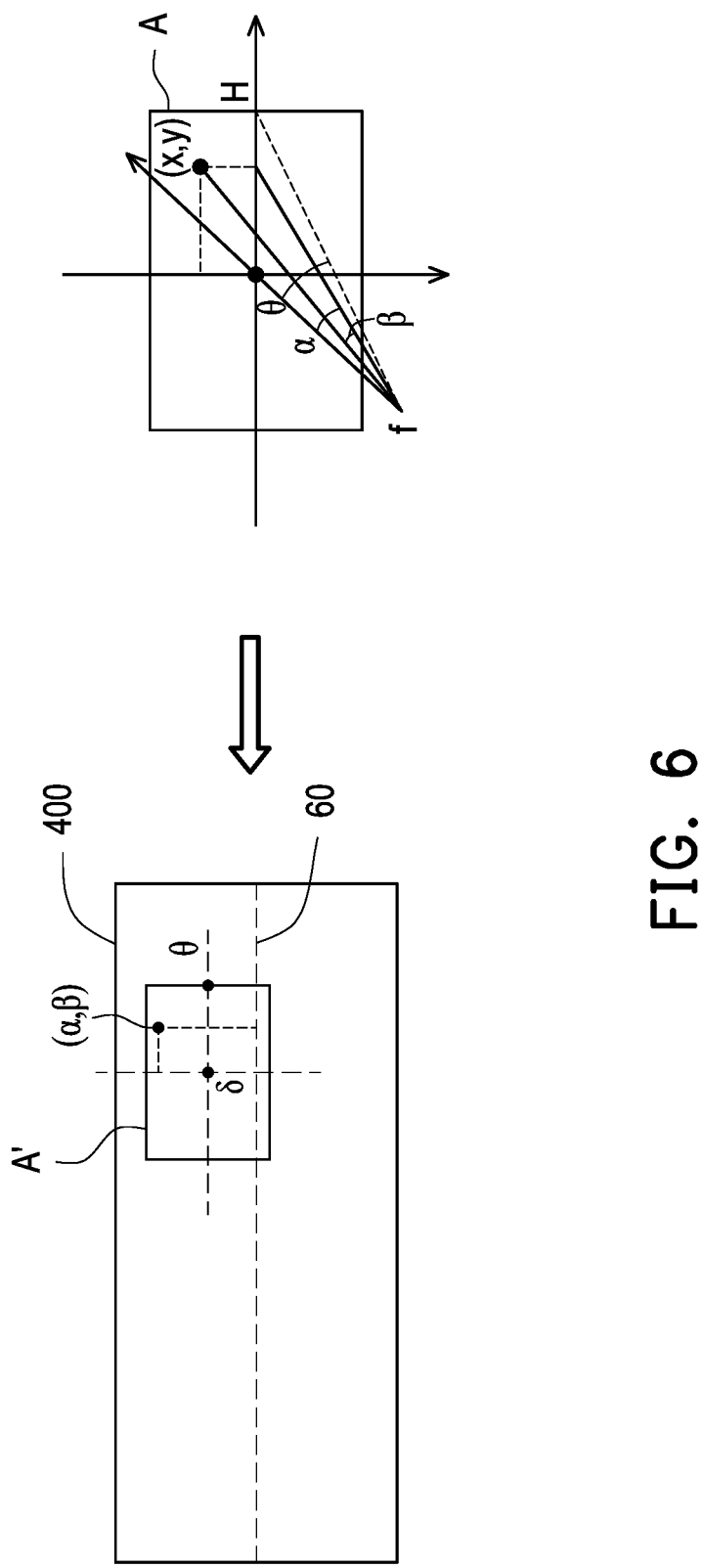
FIG. 6 is a schematic diagram of perspective projection according to an embodiment of the disclosure.

FIG. 6 is a schematic diagram of perspective projection according to an embodiment of the disclosure. If the projection method is perspective projection, the coordinate transformer 33 may map the display region A to the calibration map 400 according to equations (3) to (8) to obtain a mapping region A', where a center point of the mapping region A' corresponds to the center point of the display region A. f represents a focal length used for perspective projection of the display region A, H represents a half of a horizontal width of the display region A, θ represents a horizontal viewing angle or a half of a horizontal width of the mapping region A', δ represents a distance between a center point of the mapping region A' and an equator 60 of the calibration map 400, x represents horizontal coordinates corresponding to the display region A, y represents the vertical coordinates corresponding to the display region A, α represents a horizontal distance between the mapping point and the center point of the mapping region A' (the horizontal distance may be transformed into a horizontal angle of the equirectangular projection image), and β represents a vertical distance between the mapping point and the equator 60 (the vertical distance may be transformed into a vertical angle of the equirectangular projection image). The information of the attribute dst_w, the attribute src_w, the attribute src_y and the attribute src_h may come from the ROI window descriptor as shown in Table 3. EQT_VFOV may be the maximum vertical angle of the equirectangular projection image, EQT_HFOV may be the maximum horizontal angle of the equirectangular projection image, EQT Width may be a width of the equirectangular projection image, and EQT_Height may be a height of the equirectangular projection image. Parameters such as EQT_VFOV, EQT_HFOV. EQT Width or EQT_Height may be associated with hardware specifications of the image capturing device.

$$f = \frac{H}{\tan\theta} \quad (3)$$

$$\alpha = \tan^{-1}\frac{x}{f\cos\delta - y\sin\delta} \quad (4)$$

$$\beta = \sin^{-1}\frac{f\sin\delta + y\cos\delta}{\sqrt{x^2 + y^2 + f^2}} \quad (5)$$

$$\delta = \text{EQT\_VFOV} \cdot \frac{\text{src\_y} + 0.5 \cdot \text{src\_h}}{\text{EQT\_Height}} - 0.5 \quad (6)$$

$$H = 0.5 \cdot \text{dst\_w} \quad (7)$$

$$\theta = 0.5 * \text{src\_w} * \text{EQT\_HFOV}/\text{EQT\_Width} \quad (8)$$

Figure 7A:
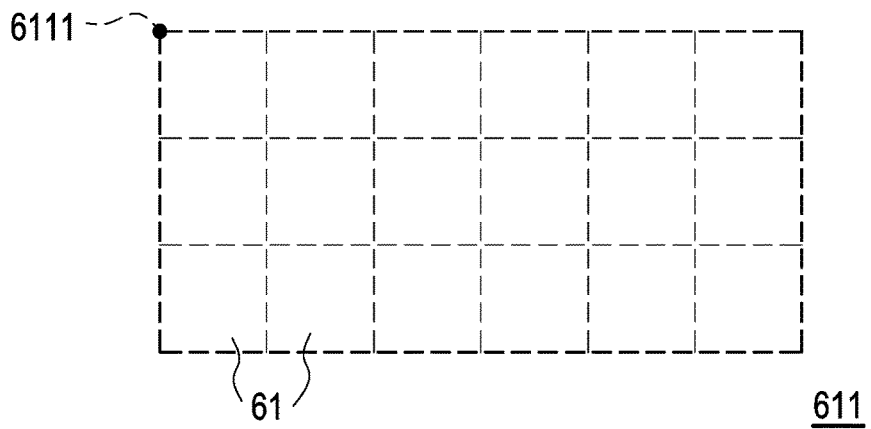
FIG. 7A is a schematic diagram of a mapping region corresponding to a sub-block according to an embodiment of the disclosure.

After the vertices of the tile or sub-block of the display region is mapped to the calibration map 400 to generate the mapping vertices and the mapping region, the primitive assembly unit 34 may partition the mapping region into a plurality of tiles according to a size of the mapping region, and the tiles are not overlapped each other. Taking the sub-block 211 as an example, FIG. 7A is a schematic diagram of a mapping region 611 corresponding to the sub-block 211 according to an embodiment of the disclosure, where the mapping region 611 is composed of a plurality of mapping vertices respectively corresponding to a plurality of vertices of the sub-block 211. For example, a vertex 6111 of the mapping region 611 is generated by mapping the vertex 2111 of the sub-block 211 to the calibration map 400. The primitive assembly unit 34 may partition the mapping region 611 into a plurality of tiles 61 according to the size of the mapping region 611, and the tiles 61 are not overlapped with each other.

In an embodiment, the primitive assembly unit 34 may determine whether the mapping region includes a splicing region of a plurality of original images according to the information recorded in the calibration map or the original vertex list. If the data structure of the vertex (namely: the attribute "ntex" as shown in Table 2) records that the vertex corresponds to multiple textures, the primitive assembly unit 34 may determine whether the mapping region formed by the vertex includes the splicing region. If the mapping region includes the splicing region, the primitive assembly unit 34 may further partition the tiles in the calibration map into a plurality of primitives. Specifically, the primitive assembly unit 34 may determine a shape of the primitive according to a size of the splicing region, and then partition the mapping region into multiple primitives.

Figure 7B:
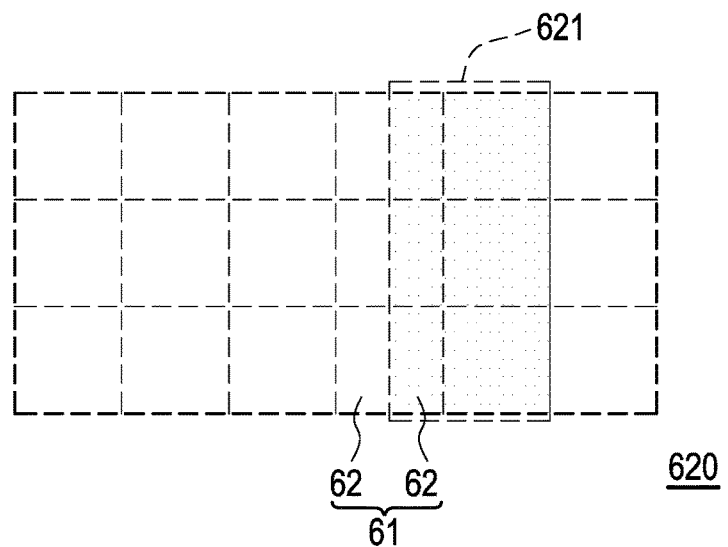
FIG. 7B and FIG. 7C are schematic diagrams of partitioning tiles into a plurality of primitives according to an embodiment of the disclosure.
Figure 7C:
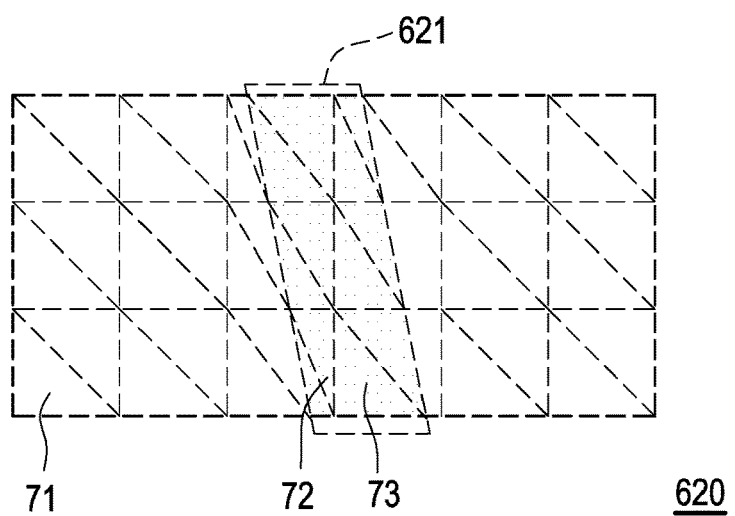

FIG. 7B and FIG. 7C are schematic diagrams of partitioning tiles into a plurality of primitives according to an embodiment of the disclosure. Referring to FIG. 2B and FIG. 7B, it is assumed that the coordinate transformer 33 maps the vertices of a tile 220 in the layout 200 to the calibration map to generate a mapping region 620, and it is assumed that the tile 220 (or the display region C) corresponds to the calibration map 400. Since the tile 220 includes a splicing line 22 of the two original images, the mapping region 620 includes a splicing region 621 corresponding to the splicing line 22. The primitive assembly unit 34 may determine that the mapping region 620 includes the splicing region 621 according to the original vertex list corresponding to the calibration map 400. If at least one vertex related to a specific point in the calibration map 400 corresponds to multiple textures (i.e., multiple textures corresponding to the splicing region 621), the primitive assembly unit 34 may determine that the specific point is located in the splicing region 621. Otherwise, the primitive assembly unit 34 may determine that the specific point is located outside the splicing region 621.

To be specific, if the specific point on the calibration map 400 is located on an existing vertex of the calibration map 400 (i.e., a vertex recorded in the original vertex list), the primitive assembly unit 34 may determine that the existing vertex is associated with the specific point, and determine whether the specific point is located in the splicing region 621 according to the existing vertex. If the specific point is located on a connection line between two existing vertices of the calibration map 400, the primitive assembly unit 34 may determine whether one of the two existing vertices corresponds to multiple textures. If one of the two existing vertices corresponds to the multiple textures, the primitive assembly unit 34 may determine that the specific point is located in the splicing region 621. If the specific point is located within a tile (for example: the tile 410) of the calibration map 400, the primitive assembly unit 34 may determine whether four existing vertices closest to the specific point on the calibration map 400 (i.e.: four vertices recorded in the original vertex list and enclosing the specific point) correspond to the multiple textures. If one of the four existing vertices corresponds to the multiple textures, the primitive assembly unit 34 may determine that the specific point is located in the splicing region 621.

After determining that the mapping region 620 includes the splicing region 621, the primitive assembly unit 34 may partition the mapping region 620 (or the splicing region 621) into a plurality of primitives according to the size of the splicing region 621, where the primitives are not overlapped with each other. The generated primitives may be pieced together to form the complete splicing region 621. Taking FIG. 7B as an example, it is assumed that the splicing region 621 is a rectangle, the primitive assembly unit 34 may partition the tile 61 partially overlapped with the splicing region 621 into two rectangular primitives 62. The splicing region 621 may be composed of 3 tiles 61 and 3 primitives 62. Taking FIG. 7C as an example, it is assumed that the splicing region 621 is a parallelogram, the primitive assembly unit 34 may partition the mapping region 620 into a plurality of triangular primitives, such as a primitive 71, a primitive 72 and a primitive 73. The splicing region 621 in the mapping region 620 may be composed of 12 triangular primitives.

After the primitive assembly unit 34 partitions the mapping region 620 into multiple primitives, the calibration map 400 may include several types of vertices such as existing vertices (i.e.: vertices recorded in the original vertex list), mapping vertices (for example, vertices generated by mapping vertices of a tile 22 in the layout 200 to the calibration map 400) and primitive vertices (for example, vertices of the primitive 62) in the mapping region (for example, the mapping region 620). Since the original vertex list only records data structures of the existing vertices, data structures of mapping vertices or primitive vertices are unknown. Accordingly, the attribute interpolator 36 may perform an interpolation operation according to data structures of the existing vertices to obtain the data structures of the mapping vertices or primitive vertices.

Figure 8A:
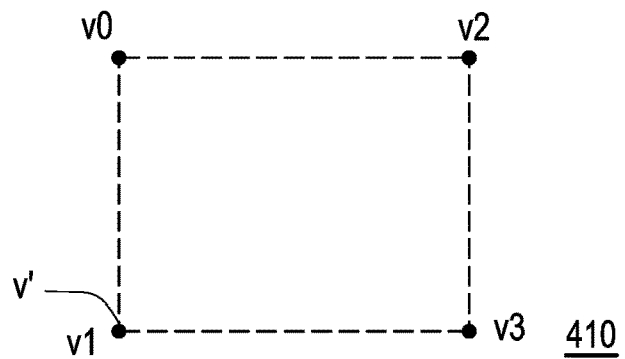
FIG. 8A, FIG. 8B and FIG. 8C are schematic diagrams of a tile according to an embodiment of the disclosure.
Figure 8B:
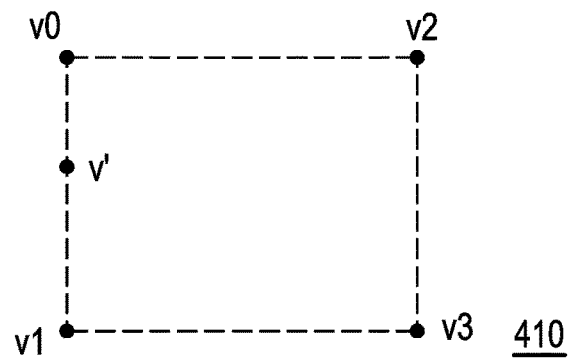
Figure 8C:
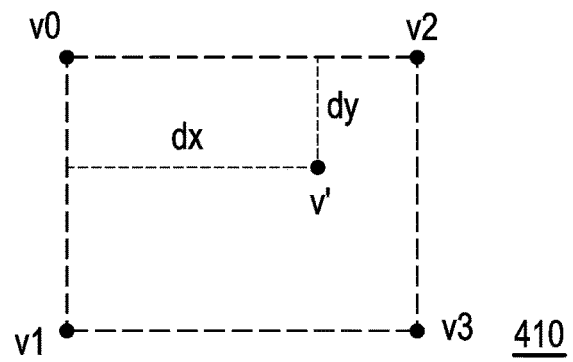

To be specific, the calibration map searcher 35 may determine which existing vertex in the calibration map 400 is related to the specific vertex (i.e., the mapping vertex or primitive vertex) in the mapping region. Taking the tile 410 shown in FIG. 4 as an example, the calibration map searcher 35 may determine which vertex of the tile 410 is associated with the specific vertex based on a position of the specific vertex in the tile 410. FIG. 8A, FIG. 8B and FIG. 8C are schematic diagrams of the tile 410 according to an embodiment of the disclosure, where vertices v0, v1, v2 and v3 of the tile 410 are existing vertices recorded in the original vertex list. Referring to FIG. 8A, if a vertex v' in the mapping region (for example: the mapping region 620) is located on the vertex v1 of the calibration map 400, the calibration map searcher 35 may determine that the vertex v1 is associated with the vertex v'. Referring to FIG. 8B, if the vertex v' is located on a connection line between two existing vertices (i.e.: the vertices v0 and v1) of the calibration map 400, the calibration map searcher 35 may determine that the vertex v0 and the vertex v1 are associated with the vertex v'. Referring to FIG. 8C, if the vertex v' is located within the tile 410 of the calibration map 400, the calibration map searcher 35 may determine that the four existing vertices closest to the vertex v' on the calibration map 400 (i.e.: the vertices v0, v1, v2 and v') are associated with the vertex v'.

If the vertex v' is associated with a single existing vertex, the attribute interpolator 36 may generate a data structure of the vertex v', where the data structure of the vertex v' is the same as the data structure of the existing vertex. Taking FIG. 8A as an example, the attribute interpolator 36 may set the data structure of the vertex v' to the data structure of the vertex v1. On the other hand, if the vertex v' is associated with multiple existing vertices, the attribute interpolator 36 may perform an interpolation operation on the multiple data structures corresponding to the multiple existing vertices to obtain the data structure corresponding to the vertex v'.

Taking FIG. 8C as an example, the attribute interpolator 36 may perform an interpolation operation on the plurality of data structures respectively corresponding to the vertices v0, v1, v2 and v3 to obtain the data structure of the vertex v'. In an embodiment, the attribute interpolator 36 may perform a bilinear interpolation operation as shown in equation (9) to obtain the attribute "(u, v)" or the attribute "alpha" in the data structure of the vertex v', where dx is a distance between an origin (i.e., the vertex v0 of the upper left corner) and the vertex v' of the tile 410 in an x direction, dy is a distance between the origin and the vertex v' of the tile 410 in a y direction, v'.k is an attribute value (for example: attribute value of the attribute (u, v) or alpha) of the vertex v', v0.k is an attribute value of the vertex v0, B[0] is a weight corresponding to the vertex v0, v1.k is an attribute value of the vertex v1, B[1] is a weight corresponding to the vertex v1, v2.k is an attribute value of the vertex v2, B[2] is a weight corresponding to the vertex v2, v3.k is an attribute value of the vertex v3, and B[3] is a weight corresponding to the vertex v3.

$$\begin{cases} v' \cdot k = B[0] \cdot v0 \cdot k + B[1] \cdot v1 \cdot k + B[2] \cdot v2 \cdot k + B[3] \cdot v3 \cdot k \\ B[0] = (1-dx)(1-dy), B[1] = (1-dx)dy \\ B[2] = dx(1-dy), B[3] = dx \cdot dy \end{cases} \quad (9)$$

In the data structure of the vertex v', not all of the attribute values are obtained by performing interpolation operations. In an embodiment, the attribute interpolator 36 may calculate an accumulated value of the scaling factor for each overlapping control region (corresponding to the attribute sca_bland[i]) in the data structure. The attribute interpolator 36 may calculate an accumulated value w[i] of the scaling factor according to equation (10), where i represents an index of the overlapping control region (i=1–m), and j represents an index of the existing vertex associated with the vertex v' (j=0-3), w[i] represents the accumulated value of the scaling factor corresponding to an $i^{th}$ overlapping control region, v[j].sca_blend[i] represents a blending weight indicated by the attribute "sca_blandi (i=1–m)" of the vertex vj, and B[j] represents a weight corresponding to the vertex vj.

$$w[i] = \Sigma_{j=0}^{3} v[j].sca\_blend[i] \cdot B[j] \quad (10)$$

The attribute interpolator 36 may select one or more scaling factors with a larger accumulated value from a plurality of scaling factors to assign to the vertex v', thereby generating the data structure of the vertex v'. If the plurality of scaling factors includes a first scaling factor and a second scaling factor, the attribute interpolator 36 may preferentially select the first scaling factor from the first scaling factor and the second scaling factor to generate the data structure of the vertex v' in response to the first accumulated value corresponding to the first scaling factor being greater than the second accumulated value corresponding to the second scaling factor. The larger the accumulated value of the scaling factor is, the greater an influence degree of the scaling factor on the vertex v' is. The smaller the accumulated value of the scaling factor is, the smaller the influence degree of the scaling factor on the vertex v is. The attribute interpolator 36 may set the attribute "sca_id1" of the vertex v' to point to the scaling factor with the largest accumulated value, and may set the attribute "sca_id2" of the vertex v' to point to the scaling factor with the secondary largest accumulated value. Deduced by analogy, the attribute interpolator 36 may set the attribute "sca_idm" of the vertex v' to point to the scaling factor with the smallest accumulated value.

For example, after m accumulated values w[i] (i=1–m) are calculated for m overlapping control regions, the attribute interpolator 36 may select the larger n accumulated values from the m accumulated values w[i] (n≤m). Taking n=2 as an example, the attribute interpolator 36 may select a scaling factor corresponding to an accumulated value w[p1] in response to the accumulated value w[p1] being the largest accumulated value among the m accumulated values, and set the attribute "sca_id1" and the attribute "sca_blend1" of the vertex v' according to the selected scaling factor. The attribute interpolator 36 may select a scaling factor corresponding to an accumulated value w[p2] in response to the accumulated value w[p2] being the secondary largest accumulated value among the m accumulated values, and set the attribute "sca_id2" and the attribute "sca_blend2" of the vertex v' according to the selected scaling factor. The attribute interpolator 36 may set the attribute "sca_id1" of the vertex v' to point to the identifier of the selected scaling factor corresponding to the accumulated value w[p1], and may calculate the attribute "sca_blend1" according to equation (11). The attribute interpolator 36 may set the attribute "sca_id2" of the vertex v' to point to the identifier of the selected scaling factor corresponding to the accumulated value w[p2], and may calculate the attribute "sca_blend2" according to equation (11). k represents an index of the attribute "sca_blend" (when k=1, sca_blend[k] represents the attribute sca_blend1), j represents an index of n selected accumulative values (for example: j=1 indicates the accumulative value w[p1]; j=2 indicates the accumulated value w[p2]), and l represents an index of an accumulated value of the selected scaling factor (for example: when l=p1, w[I] represents the accumulated value w[p1]; when I=p2, w[I] represents the accumulated value w[p2]).

$$sca\_blend[k] = \frac{w[l]}{\sum_{j=1}^{n} w[pj]} \quad (11)$$

In an embodiment, the storage medium 120 has a memory array hid and a memory array hist, where the memory array hid is used to store the attribute "sca_id" of the m overlapping control regions, and the memory array hist is used to store the attribute "sca_blend" of the m overlapping control regions.

In an embodiment, after calculating a product v[j].sca_blend[α]·B[j] (α∈[1, 2 . . . m]), the attribute interpolator 36 may determine whether the scaling factor (corresponding to the attribute sca_id[α]) corresponding to the product v[j].sca_blend[α]·B[j] matches an address #1 in the memory array hid, and determine whether any data is stored in the address #1 in the memory array hid. If no data is stored in the address #1 (as shown in Table 6), the attribute interpolator 36 may store the attribute sca_id[α] indicating the scaling factor in the address #1 of the memory array hid, and accumulate the product v[j].sca_blend[α]·B[j] to an accumulated value A in an address #A of the memory array hist, as shown in Table 7, where the address #A corresponds to the address #1.

TABLE 6

| Memory array | Address #1 | Address #2 | Address #3 | ... | Address #m |
|---|---|---|---|---|---|
| hid | — | — | — | ... | — |

TABLE 7

| Memory array | Address #1 | Address #2 | Address #3 | ... | Address #m |
|---|---|---|---|---|---|
| hid | sca_id[α] | — | — | ... | — |
| Memory array | Address #A | Address #B | Address #C | .. | Address #M |
| hist | Accumulated value A | — | — | ... | — |

If data is stored in the address #1 in the memory array hid, the attribute interpolator 36 may further determine whether the scaling factor (corresponding to the attribute sca_id[α]) corresponding to the product v[j].sca_blend[α]·B[j] matches the address #1 in the memory array hid. If the scaling factor corresponding to the product v[j].sca_blend[α]·B[j] matches the address #1 in the memory array hid (as shown in Table 8), the attribute interpolator 36 may accumulate the product v[j].sca_blend[α]·B[j] to the accumulated value A in the address #A of the memory array hist, as shown in Table 7 where the address #A corresponds to the address #1.

TABLE 8

| Memory array | Address #1 | Address #2 | Address #3 | ... | Address #m |
|---|---|---|---|---|---|
| hid | sca_id[α] | — | — | ... | — |

If data is stored in the address #1 in the memory array hid, and the scaling factor corresponding to the product v[j].sca_blend[α]·B[j] does not match the address #1 in the memory array hid (as shown in Table 9), the attribute interpolator 36 may store the attribute sca_id[α] indicating the scaling factor in the address #2 of the memory array hid where no data has been stored, and accumulate the product v[j].sca_blend[α]·B[j] to the accumulated value B in the address #B of the memory array his, as shown in Table 10, where the address #B corresponds to the address #2.

TABLE 9

| Memory array | Address #1 | Address #2 | Address #3 | ... | Address #m |
|---|---|---|---|---|---|
| hid | sca_id[β] | — | — | ... | — |

TABLE 10

| Memory array | Address #1 | Address #2 | Address #3 | ... | Address #m |
|---|---|---|---|---|---|
| hid | sca_id[β] | sca_id[α] | — | ... | — |
| Memory array | Address #A | Address #B | Address #C | ... | Address #M |
| hist | Accumulated value A | Accumulated value B | — | ... | — |

In an embodiment, the storage medium 120 may store a lookup table, where the lookup table may include a mapping relationship between the attribute "sca_id" and the address of the memory array hid. After calculating the product v[j].sca_blend[α]·B[j] corresponding to the "attribute sca_id [α]", the attribute interpolator 36 may determine the address (for example, the address #1) corresponding to the "attribute sca_id[α]" in the memory array hid according to the lookup table. The attribute interpolator 36 may further accumulate the product v[j].sca_blend[α]·B[j] to the corresponding address (for example, the address #A corresponding to the address #1) in the memory array hist. By using the lookup table to calculate the accumulated value may avoid executing the step of "determining whether the product matches the address of the memory array hid", thereby significantly reducing consumption of computing resources.

After obtaining one or more attributes "sca_id" and attribute "sca_blend" of the vertex v', the attribute interpolator 36 may calculate an attribute "scaling coefficient" of the vertex v' according to equation (12), where i represents an index of the overlapping control region, j represents an index of the existing vertex associated with the vertex v', v'.S represents an attribute value of the attribute "scaling coefficient" of the vertex v', v[j].S represents a warping value corresponding to the existing vertix, B[j] represents a weight corresponding to the existing vertex, (v[j].sca_id[i]) represents a scaling factor of the existing vertex, (v[j].sca_blend [i]) represents a blending weight of the existing vertex, and C(v[j].sca_id[i]) represents a warping coefficient corresponding to the scaling factor (v[j].sca_id[i]).

$$\begin{cases} v' \cdot S = \sum_{j=0}^{3} [j] \cdot S \cdot B[j] \\ v[j] \cdot S = \sum_{i=1}^{m} C(v[j] \cdot \text{sca\_id}[i]) \cdot v[j] \cdot \text{sca\_blend}[i] \end{cases} \quad (12)$$

In an embodiment, the processor 110 may have a plurality of cores. The attribute interpolator 36 may use the multiple cores to generate a plurality of data structures respectively corresponding to a plurality of vertices. In this way, the image processing device 10 may quickly obtain the data structure of each vertex (for example: the vertex v).

After obtaining the data structure of the vertex v', the vertex generator 37 may add the data structure of the vertex v' to the original vertex list to update the original vertex list, thereby generating a composed vertex list. The vertex generator 37 may output the composed vertex list to the image processing module 127. The image processing module 127 may map the input image to the layout 200 to generate an output image according to the composed vertex list. In other words, the image processing module 127 may render the input image according to the composed vertex list to generate the output image. The image processing module 127 may output the generated output image through the transceiver 130. U.S. patent publication number "U.S. Ser. No. 10/104,288" or Taiwanese patent publication number "I622021" recites the specific implementation of rendering the input image according to the vertex list to generate the output image.

In an embodiment, the processor 110 may obtain information from the original vertex list, the ROI window descriptor and the sub-display region descriptor, and store the obtained information in an intra frame cache of the storage medium 120. Table 11 is an example of a data structure of the intra frame cache, where the data structure includes a group of the attribute "ntex", the attribute "win_id" and the attribute "vtx_addr". Before the attribute interpolator 36 generates a data structure for a vertex, the attribute interpolator 36 may determine whether the attribute value of the vertex matches the attribute "ntex" and the attribute "win_id" in any group. If the attribute value of the vertex matches the attribute "ntex" and the attribute "win_id" in a group, it means that the data structure of the vertex already exists. Accordingly, the attribute interpolator 36 may set the data structure of the vertex as the data structure indicated by the attribute "vtx_addr" in the group. For example, if two tiles in a mapping region (for example: the mapping region 611) are adjacent to each other, which are respectively a tile #1 and a tile #2, after generating the data structure of each vertex of the tile #1, the attribute interpolator 36 may determine that the data structures of the vertices on a common edge of the tile #1 and the tile #2 have been generated according to the intra frame cache. Therefore, when generating the data structure of each vertex of the tile #2, the attribute interpolator 36 may omit the step of generating the data structures of the vertices on the common edge, thereby speeding up the image processing process.

TABLE 11

| Attribute | Description |
| --- | --- |
| ntex | Number of textures corresponding to the vertices in the frame |
| win_id | Identifier of the ROI window in the source image of the frame |
| vtx_addr | Memory address of the data structure of the vertex in the frame |

In an embodiment, the vertex generator 37 may generate a current frame header corresponding to a current frame of the output image according to the composed vertex list. Table 12 is an example of the frame header, where an attribute "win_desc" may indicate the display region in the layout 200 of the output image. When the output image enters a next frame, the current frame header will become a reference frame header of the next frame.

TABLE 12

| Attribute | Description |
| --- | --- |
| vertex_data | Memory address of the data structure of the vertex in the frame |
| win_num | Number of ROI windows in the frame |
| win_desc | Memory address of the ROI window descriptor |
| subwin_desc | Memory address of a sub-display region descriptor in the frame |

When the attribute interpolator 36 generates a data structure for the vertex in the displace region corresponding to the next frame of the output image, the attribute interpolator 36 may determine whether the display region of the next frame matches the display region indicated by the reference frame header. To be specific, the reference frame header may indicate an inter frame cache corresponding to the display region (or sub-display region) of the reference frame in the storage medium 120, where the inter frame cache includes attributes "cache_ref_id1" and "cache_ref_id2". If the attribute "id1" of the display region of the next frame is the same as the attribute "cache_ref_id1" indicated by the reference frame header, and the attribute "id2" of the display region of the next frame is the same as the attribute "cache_ref_id2" indicated by the reference frame header, the attribute interpolator 36 may determine that the two display regions match each other. Otherwise, the attribute interpolator 36 may determine that the two display regions do not match.

The attribute interpolator 36 may copy the data in the reference frame header in response to the display region of the next frame matching the display region indicated by the reference frame header, where the data includes a vertex in the display region indicated by the reference frame header and a data structure corresponding to the vertex. The copied data is used to generate a composed vertex list corresponding to the next frame.

Figure 9:
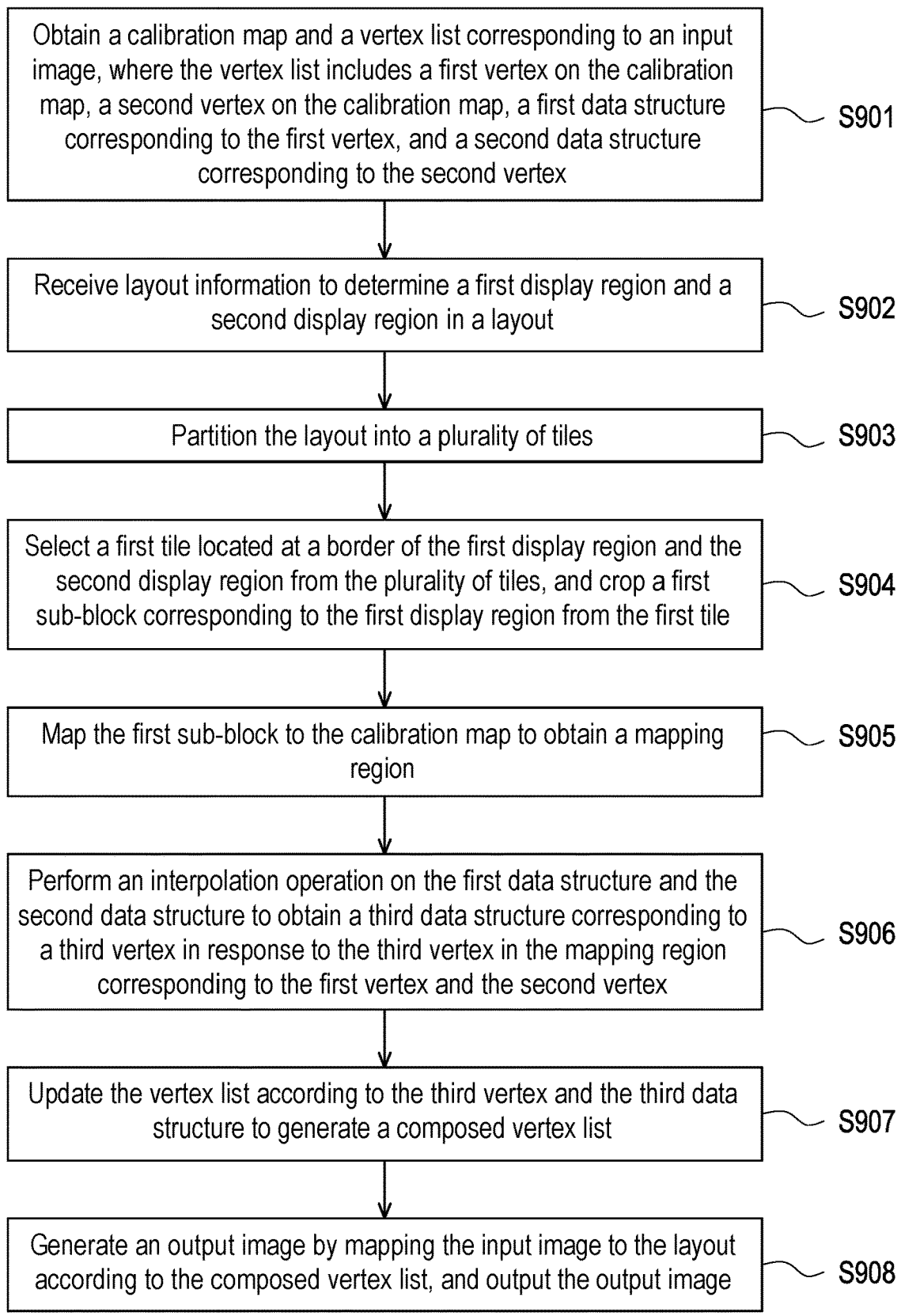
FIG. 9 is a flowchart of an image processing method of generating a layout including a plurality of images according to an embodiment of the disclosure.

FIG. 9 is a flowchart of an image processing method of generating a layout including a plurality of images according to an embodiment of the disclosure, where the image processing method may be implemented by the image processing device 10 shown in FIG. 1. In step S901, a calibration map and a vertex list corresponding to an input image are obtained, where the vertex list includes a first vertex on the calibration map, a second vertex on the calibration map, a first data structure corresponding to the first vertex, and a second data structure corresponding to the second vertex. In step S902, layout information is received to determine a first display region and a second display region in a layout. In step S903, the layout is partitioned into a plurality of tiles. In step S904, a first tile located at a border of the first display region and the second display region is selected from the plurality of tiles, and a first sub-block corresponding to the first display region is cropped from the first tile. In step S905, the first sub-block is mapped to the calibration map to obtain a mapping region. In step S906, an interpolation operation is performed on the first data structure and the second data structure to obtain a third data structure corresponding to a third vertex in response to the third vertex in the mapping region corresponding to the first vertex and the second vertex. In step S907, the vertex list is updated according to the third vertex and the third data structure to generate a composed vertex list. In step S908, an output image is generated by mapping the input image to the layout according to the composed vertex list, and the output image is output.

In summary, the image processing device of the disclosure may generate a layout with multiple display regions according to the vertex list of the calibration map based on the user's requirement on the layout, where different display regions may be used to display different images. The image processing device may map the display region to the calibration map taking a tile as a unit to generate the mapping region, and then perform an interpolation operation on the mapping region according to the vertex list of the calibration map to obtain the data structure of each vertex. The image processing device may map the input image to the display region of the layout according to the data structure of each vertex to generate the output image. For the border or splicing region of different display regions, the image processing device may further crop the tiles into sub-blocks or primitives, so that the border or splicing region includes more vertices and corresponding data structures. Accordingly, when mapping the input image to the layout according to the vertex list, the image processing device may allocate more computing resources to the border or splicing region in the display region. Therefore, the disclosure may generate output images with multiple display regions in optimal efficiency.

What is claimed is:

1. An image processing device of generating a layout comprising a plurality of images, the image processing device comprising:
   a transceiver, obtaining a calibration map and a vertex list corresponding to an input image, wherein the vertex list comprises a first vertex on the calibration map, a second vertex on the calibration map, a first data structure corresponding to the first vertex, and a second data structure corresponding to the second vertex;
   a storage medium, storing a plurality of modules; and
   a processor, coupled to the storage medium and the transceiver, and accessing and executing the plurality of modules, wherein the plurality of modules comprise:
      a region of interest composer, receiving layout information through the transceiver to determine a first display region and a second display region in the layout;
      a frame tile partition unit, partitioning the layout into a plurality of tiles;
      a tile splitter, selecting a first tile located at a border of the first display region and the second display region from the plurality of tiles, and cropping a first sub-block corresponding to the first display region from the first tile;
      a coordinate transformer, mapping the first sub-block to the calibration map to obtain a mapping region;
      an attribute interpolator, performing an interpolation operation on the first data structure and the second data structure to obtain a third data structure corresponding to a third vertex in response to the third vertex in the mapping region corresponding to the first vertex and the second vertex;
      a vertex generator, updating the vertex list according to the third vertex and the third data structure to generate a composed vertex list; and
      an image processing module, generating an output image by mapping the input image to the layout according to the composed vertex list, and outputting the output image through the transceiver.

2. The image processing device according to claim 1, wherein the plurality of modules further comprises:
   a primitive assembly unit, partitioning the mapping region into a plurality of primitives according to a size of the mapping region, wherein the plurality of primitives comprise a first primitive with the third vertex.

3. The image processing device according to claim 1, wherein the plurality of modules further comprise:
   a primitive assembly unit, determining whether the mapping region comprises a splicing region of a plurality of original images according to the vertex list, and partitioning the mapping region into a plurality of primitives according to a size of the splicing region in response to the mapping region comprising the splicing region, wherein the plurality of primitives comprise a first primitive with the third vertex.

4. The image processing device according to claim 2, wherein each of the plurality of primitives is a geometric structure with vertices.

5. The image processing device according to claim 1, wherein the layout information comprises a first original display region and a second original display region in the layout, wherein the region of interest composer partitions the first original display region into a plurality of sub-display regions comprising the first display region in response to the first original display region partial overlapped with the second original display region, wherein the plurality of sub-display regions are not overlapped with each other, and each of the plurality of sub-display regions is not overlapped with the second original display region.

6. The image processing device according to claim 5, wherein the layout information comprises a first priority corresponding to the first original display region and a second priority corresponding to the second original display region, wherein
   the region of interest composer partitions the first original display region in response to the first priority being lower than the second priority.

7. The image processing device according to claim 1, wherein
   the region of interest composer determines a projection method according to the layout information, wherein
   the coordinate transformer maps the first sub-block to the calibration map to obtain the mapping region according to the projection method.

8. The image processing device according to claim 1, wherein
   the attribute interpolator determines a first weight corresponding to the first vertex and a second weight corresponding to the second vertex according to a distance between the third vertex and the first vertex in a first direction.

9. The image processing device according to claim 8, wherein
   the attribute interpolator calculates a first product of a first attribute value and the first weight in the first data structure and a second product of a second attribute value and the second weight in the second data structure to generate the third data structure.

10. The image processing device according to claim 8, wherein the first data structure comprises a first scaling factor and a first blending weight corresponding to the first vertex, and the second data structure comprises a second scaling factor and a second blending weight corresponding to the second vertex, wherein
    the attribute interpolator calculates a first product of the first blending weight and the first weight to obtain or update a first accumulated value corresponding to the first scaling factor, and calculates a second product of the second blending weight and the second weight to obtain or update a second accumulated value corresponding to the second scaling factor, wherein
    the attribute interpolator selects the first scaling factor from the first scaling factor and the second scaling factor to generate the third data structure in response to the first accumulated value being greater than the second accumulated value.

11. The image processing device according to claim 10, wherein the storage medium further stores a first memory array and a second memory array, wherein
    after obtaining the first product, the attribute interpolator determines whether the first scaling factor matches a first address in the first memory array and determines whether data is stored in the first address, wherein
    if the data is stored in the first address, in response to determining that the first scaling factor matches the first address, the attribute interpolator accumulates the first product to a second address corresponding to the first address in the second memory array, wherein if the data is stored in the first address, in response to determining that the first scaling factor does not match the first address, the attribute interpolator stores the first scaling factor in a third address in the first memory array, and accumulates the first product to a fourth address corresponding to the third address in the second memory array, wherein if the data is not stored in the first address, the attribute interpolator stores the first scaling factor in the first address, and accumulates the first product to the second address.

12. The image processing device according to claim 10, wherein the storage medium further stores a first memory array and a second memory array, wherein the first scaling factor matches a first address in the first memory array, wherein the attribute interpolator accumulates the first product to a second address corresponding to the first address in the second memory array according to a lookup table.

13. The image processing device according to claim 1, wherein the vertex generator generates a current frame header corresponding to a current frame of the output image according to the composed vertex list, wherein the current frame header indicates a third display region in the layout, wherein the attribute interpolator copies data in the current frame header to generate a new composed vertex list corresponding to a next frame in response to a fourth display region in the next frame of the output image matching the third display region, wherein the data comprises a fourth vertex corresponding to the third display region and a fourth data structure corresponding to the fourth vertex.

14. The image processing device according to claim 1, wherein the input image is an equirectangular projection image.

15. The image processing device according to claim 1, wherein the layout information comprises at least:

coordinates, a width, and a height corresponding to a first region of interest of a source image; and coordinates, a width, and a height corresponding to a display region of a target image.

16. An image processing method of generating a layout comprising a plurality of images, the image processing method comprising:

obtaining a calibration map and a vertex list corresponding to an input image, wherein the vertex list comprises a first vertex on the calibration map, a second vertex on the calibration map, a first data structure corresponding to the first vertex, and a second data structure corresponding to the second vertex;

receiving layout information to determine a first display region and a second display region in the layout;

partitioning the layout into a plurality of tiles;

selecting a first tile located at a border of the first display region and the second display region from the plurality of tiles, and cropping a first sub-block corresponding to the first display region from the first tile;

mapping the first sub-block to the calibration map to obtain a mapping region;

performing an interpolation operation on the first data structure and the second data structure to obtain a third data structure corresponding to a third vertex in response to the third vertex in the mapping region corresponding to the first vertex and the second vertex;

updating the vertex list according to the third vertex and the third data structure to generate a composed vertex list; and generating an output image by mapping the input image to the layout according to the composed vertex list, and outputting the output image.

17. An image processing device of generating a layout comprising a plurality of images, the image processing device comprising:

a processor, configured to:

obtain a calibration map and a vertex list corresponding to an input image, wherein the vertex list comprises a first vertex on the calibration map, a second vertex on the calibration map, a first data structure corresponding to the first vertex, and a second data structure corresponding to the second vertex;

receive layout information to determine a first display region and a second display region in the layout;

partition the layout into a plurality of tiles;

select a first tile located at a border of the first display region and the second display region from the plurality of tiles, and crop a first sub-block corresponding to the first display region from the first tile;

map the first sub-block to the calibration map to obtain a mapping region;

perform an interpolation operation on the first data structure and the second data structure to obtain a third data structure corresponding to a third vertex in response to the third vertex in the mapping region corresponding to the first vertex and the second vertex;

update the vertex list according to the third vertex and the third data structure to generate a composed vertex list; and generate an output image by mapping the input image to the layout according to the composed vertex list, and output the output image.

* * * * *